United States Patent
Xu et al.

(10) Patent No.: US 8,265,203 B2
(45) Date of Patent: Sep. 11, 2012

(54) METHOD AND SYSTEM OF DIFFERENTIAL COMPLEX AND REAL MULTI-CARRIER DEMODULATION

(75) Inventors: Huilin Xu, Gainesville, FL (US); Chia-Chin Chong, Santa Clara, CA (US); Fujio Watanabe, Union City, CA (US)

(73) Assignee: NTT DoCoMo, Inc., Tokyo (JP)

( * ) Notice: Subject to any disclaimer, the term of this patent is extended or adjusted under 35 U.S.C. 154(b) by 479 days.

(21) Appl. No.: 12/579,142

(22) Filed: Oct. 14, 2009

(65) Prior Publication Data

US 2010/0183098 A1    Jul. 22, 2010

Related U.S. Application Data

(60) Provisional application No. 61/146,254, filed on Jan. 21, 2009.

(51) Int. Cl.
    *H03D 1/00* (2006.01)
(52) U.S. Cl. ........ 375/340; 375/260; 375/365; 375/343; 375/283; 455/116; 455/522; 455/126
(58) Field of Classification Search .................. 375/260, 375/340, 283, 343, 365, 371; 455/116, 522, 455/126
See application file for complete search history.

(56) References Cited

U.S. PATENT DOCUMENTS

| | | | |
|---|---|---|---|
| 3,488,445 A | | 1/1970 | Chang |
| 6,134,286 A * | | 10/2000 | Chennakeshu et al. ........ 375/365 |
| 6,236,864 B1 * | | 5/2001 | McGowan et al. ........... 455/522 |
| 6,539,063 B1 | | 3/2003 | Peyla et al. |
| 7,792,202 B2 * | | 9/2010 | Kim ............................. 375/260 |
| 7,826,493 B2 * | | 11/2010 | Chang et al. .................. 370/514 |
| 2003/0022639 A1 * | | 1/2003 | Hongo et al. ................. 455/116 |
| 2003/0147655 A1 | | 8/2003 | Shattil |
| 2006/0087961 A1 | | 4/2006 | Chang et al. |
| 2006/0209975 A1 | | 9/2006 | Jeong et al. |
| 2007/0263752 A1 * | | 11/2007 | Guey et al. .................... 375/340 |
| 2010/0166101 A1 * | | 7/2010 | Bisaglia et al. ............... 375/283 |

OTHER PUBLICATIONS

S. B. Weinstein and P. M. Ebert, "Data transmission by frequency division multiplexing using the discrete Fourier transform," *IEEE Trans. Com. Tech.*, vol. 19, No. 5 , pp. 628-634, Oct. 1971.
D. Goeckel and Q. Zhang, "Slightly frequency-shifted reference ultra-wideband (UWB) radio," *IEEE Trans. Commun.*, vol. 55, No. 3,: pp. 508-519, Mar. 2007.
H. Ekström, A. Furuskär, J. Karlsson, M. Meyer, S. Parkvall, J. Torsner, and M. Wahlqvist, "Technical solutions for the 3G Long-Term Evolution," *IEEE Commun. Mag.*, vol. 44, No. 3, Mar. 2006, pp. 38-45.
M. Z. Win and R. A. Scholtz, "Impulse radio: how it works," *IEEE Commun. Lett.*, vol. 2, No. 2, Feb. 1998, pp. 36-38.
PCT International Search Report for International Application No. PCT/US09/069653 dated Mar. 5, 2010, 2 pages.
PCT Written Opinion of the International Application No. PCT/US09/069653 dated Mar. 5, 2010, 3 pages.

* cited by examiner

*Primary Examiner* — Eva Puente
(74) *Attorney, Agent, or Firm* — Haynes and Boone, LLP

(57) ABSTRACT

A method and a receiver are provided for demodulating a received multi-carrier modulated signal. The demodulation procedure includes (a) multiplying the received multi-carrier modulated signal with its complex conjugate to obtain a squared signal; (b) multiplying the squared signal with a carrier demodulating signal to obtain a product signal, and integrating the product signal over the duration T. A bit decision may then be performed on the integration result using analog components without the need for high-speed analog-to-digital conversion.

12 Claims, 2 Drawing Sheets

Block diagram of the complex differential multi-carrier system.

Block diagram of the complex differential multi-carrier system.

Block diagram of the real differential multi-carrier system.

METHOD AND SYSTEM OF DIFFERENTIAL COMPLEX AND REAL MULTI-CARRIER DEMODULATION

CROSS REFERENCES TO RELATED APPLICATIONS

The present application is related to and claims priority of U.S. provisional patent application, Ser. No. 61/146,254, entitled "Method and System of Differential Complex and Real Multi-Carrier Demodulation," filed on Jan. 21, 2009. The Provisional Application is hereby incorporated by reference in its entirety.

BACKGROUND OF THE INVENTION

1. Field of the Invention

The present invention relates to wireless communications; in particular, the present invention relates to multi-carrier modulation and demodulation techniques suitable for use in wireless healthcare, wireless body area networks, and wireless sensor networks.

2. Discussion of the Related Art

Multi-carrier modulation and demodulation techniques are used in broadband wireless communications. For example, orthogonal frequency division multiplexing (OFDM) has been extensively used. Early descriptions of OFDM may be found, for example, in (a) U.S. Pat. No. 3,488,445 ("Chang"), in "Orthogonal frequency multiplex data transmission system," by R. W. Chang, which was filed on Nov. 14, 1966 and issued on Jan. 6, 1970; and (b) the article "Data transmission by frequency division multiplexing using the discrete Fourier transform" ("Weinstein"), by S. B. Weinstein and P. M. Ebert, published in *IEEE Trans. Corn. Tech.*, vol. 19, no. 5, pp. 628-634, October 1971.

OFDM modulates information samples on a set of narrowband carriers at the transmitter. At the receiver, after analog-to-digital conversion (ADC), the OFDM signal may be demodulated using a fast Fourier transform (FFT). OFDM using narrowband carriers requires only relatively simple channel equalization. However, the high-speed ADC and the digital processing that follows incur high hardware cost and high power consumption. Such costs are not economical for simple, low cost, and low data rate products, such as those found in wireless healthcare applications.

The article "Slightly frequency-shifted reference ultra-wideband (UWB) radio" ("Goeckel"), by D. Goeckel and Q. Zhang, published in *IEEE Trans. Commun.*, vol. 55, no. 3,: pp. 508-519, March 2007, discloses a dual-carrier differential modulation and demodulation scheme. Goeckel transmits one information symbol in each symbol period using a differential relationship between two carriers. At the receiver, the information symbol is demodulated and recovered using simple analog processing; Goeckel's system therefore avoids ADC and digital signal processing, thus significantly reducing system complexity and power consumption. However, because only two carriers are used, Goeckel's system takes advantage of very limited frequency resources. Goeckel's system therefore does not take advantage of frequency diversity inherent in multipath channels. Such frequency diversity represents significant efficiency in, for example, wireless body area network (WBAN) applications.

Complex multi-carrier modulation and demodulation techniques are used in a wide range of systems, such as the downlink of the long term evolution (LTE) system. Complex multi-carrier modulation and demodulation techniques in an LTE system is described, for example, in the article "Technical solutions for the 3G Long-Term Evolution" ("Ekström"), by H. Ekström et al., published in *IEEE Commun. Mag.*, vol. 44, no. 3, March 2006, pp. 38-45. Real multi-carrier modulation and demodulation techniques are also used for wireless communication systems (e.g., the impulse radio). For example, the article "Impulse radio: how it works," by M. Z. Win and R. A. Scholtz, *IEEE Commun. Lett.*, vol. 2, no. 2, February 1998, pp. 36-38, discloses real multiple-carrier modulation and demodulation.

SUMMARY

The present invention provides a method that incorporates both complex multi-carrier modulation and demodulation for complex channels and real multi-carrier modulation and demodulation for real channels.

In one embodiment, a transmitter according to the present invention may have a conventional multi-carrier transmitter structure, which uses inverse fast Fourier transform (IFFT) and discrete Cosine transform (DCT) techniques to provide multi-carrier modulation. In such a transmitter, one information sample is modulated in each symbol duration on all carriers in a differential manner. The present invention provides a simple receiver structure, which avoids expensive complex digital components, such as ADC, a high accuracy sampling clock and a high-speed digital signal processer (DSP). At the receiver, the information sample is demodulated using a simple two-step analog processing technique. In one embodiment, the received signal is squared and the resultant waveform is then carrier-demodulated.

According to one embodiment of the present invention, the information sample may be demodulated using an analog receiver. As compared to OFDM modulation/demodulation schemes (e.g., those disclosed in Chang and Weinstein, discussed above), the modulation/demodulation scheme of the present invention avoids both high cost digital components and high power consumption. Such cost savings are important for wireless healthcare applications, e.g., WBANs, and wireless home control applications e.g., such as home automation, and wireless sensor networks, etc.

Unlike Goekel (discussed above), the techniques of the present invention are applicable broadly to use any arbitrary number of carriers to support different data rates, depending on the needs of the specific application. Therefore, the present invention efficiently exploits frequency resources more efficiently, taking advantage of frequency diversity provided by a multipath channel. The present invention is applicable to narrowband, wideband and ultra-wideband systems, depending on the number of carriers used.

The present invention is better understood upon consideration of the detailed description below in conjunction with the accompanying drawings.

DETAILED DESCRIPTION OF THE PREFERRED EMBODIMENTS

Figure 1:
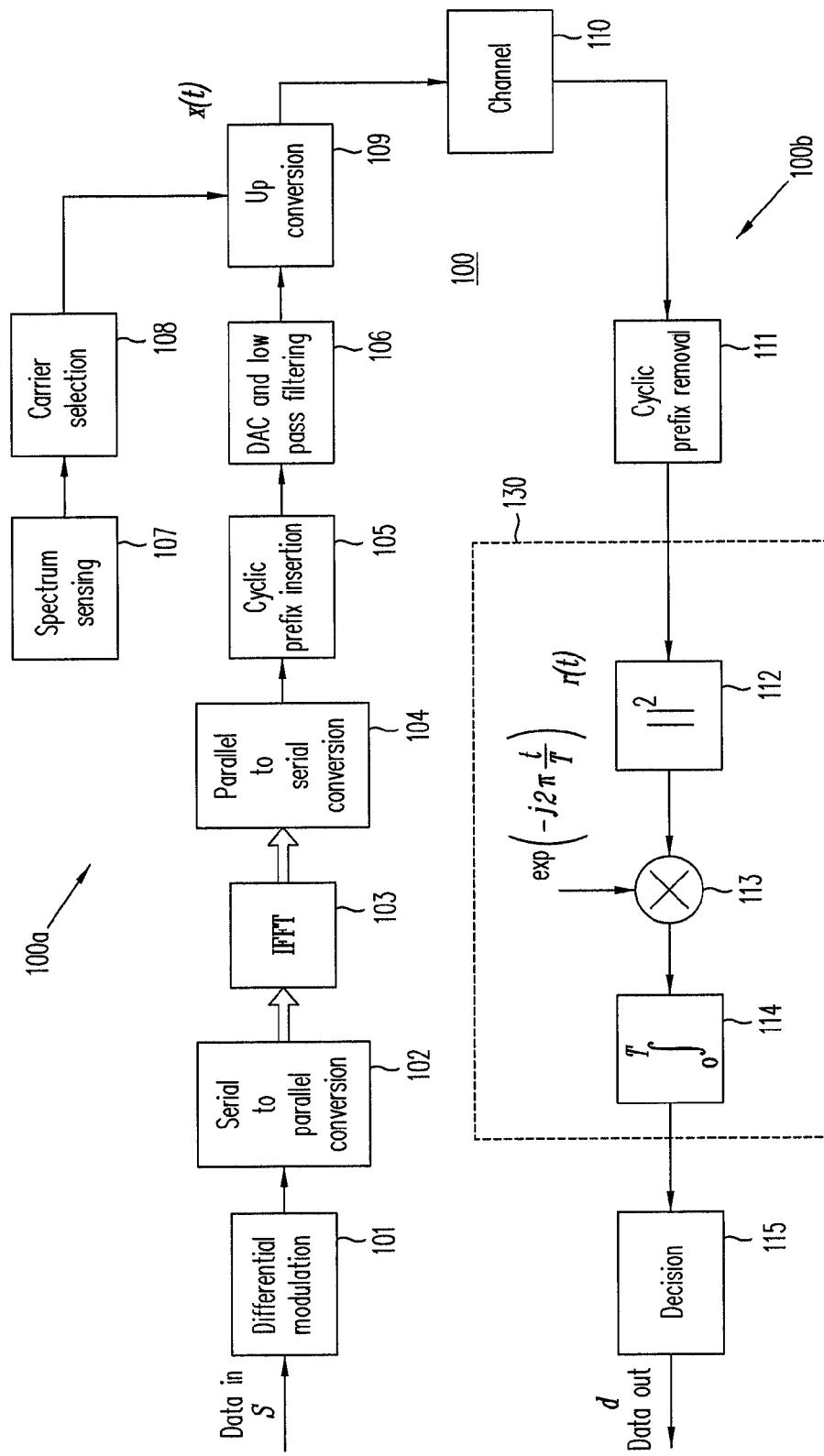
FIG. 1 is a block diagram of complex differential multi-carrier system 100, in accordance with one embodiment of the present invention.

According to one embodiment of the present invention, complex multi-carrier differential modulation and demodulation techniques may be used in a complex channel. FIG. 1 is a block diagram of complex differential multi-carrier system 100, in accordance with one embodiment of the present invention. As shown in FIG. 1, a M-ary phase shift keying (MPSK) signal s is transmitted during symbol duration T by transmitter 100a, which may be a conventional OFDM transmitter. (Of course, MPSK is used in FIG. 1 merely as an example; other signal modulation scheme may also be used to provide signal s.) Differential modulation module 101 constructs data samples $\alpha_k$, k=0, ... K−1 from amplitude-normalized MPSK signal s according to the following equations:

$$\alpha_0=1$$

$$\alpha_k=\alpha_{k-1}s, k=1,\ldots K-1 \quad (1)$$

In complex differential multi-carrier system 100, in order to avoid interference with other wireless systems, transmitter 100a selects carrier frequency $f_0$ in carrier selection module 108 from a portion of the spectrum that is not currently used by another system, after scanning the spectrum with spectrum sensing module 107.

The symbols $\alpha_k$, k=0, ... K−1, are modulated on to K orthogonal complex carriers $\exp(j2\pi(k/T+f_c)t)$, k=0, ... K−1, in the duration t∈[0,T] in transmitter 100a. As shown in FIG. 1, the serially created K data samples in differential modulation module 101 are provided to serial-to-parallel conversion 102 to create a K-dimensional vector. The K parallel samples in the vector are then subject to an inverse Fourier Transform (IFFT) at IFFT module 103. The resulting K time-domain samples are then summed in parallel-to-serial conversion 104, a cyclic prefix (CP) is then inserted by CP module 105 and the resulting signal is made a baseband analog signal in digital-to-analog conversion (DAC) and low-pass filter 106. The baseband signal is modulated onto carrier in up-conversion module 109 and transmitted from a transmit antenna. The resultant transmitted waveform (not including the CP term) is represented by $$x(t) = \sum_{k=0}^{K-1} a_k \exp\left(j2\pi\left(\frac{k}{T}+f_c\right)(t-T_{cp})\right), t \in [0, T+T_{cp}], \quad (2)$$

where $T_{cp}$ is the length of the CP.

After propagating through channel 110, the transmitted signal is received into receiver 100b over a receive antenna. The CP may be removed from the waveform using any suitable conventional technique in cyclic prefix removal module 111. The received waveform may be represented by:

$$r(t) = \sum_{k=0}^{K-1} H_k a_k \exp\left(j2\pi\left(\frac{k}{T}+f_c\right)t\right) + n(t), t \in [0, T], \quad (3)$$

where $H_k$ is the channel frequency response on the k th carrier and n(t) is a noise term. In receiver 100b, demodulation may be carried out by steps carried out in module 130. The square (of the modulus) of the received waveform r(t) is obtained in squaring module 112 by multiplying r(t) with its complex conjugate r'(t), which is obtained in a complex conjugate operation:

$$r(t)r'(t) = \sum_{n=0}^{K-1}\sum_{m=0}^{K-1} H_n H'_m a_n a'_m \exp\left(j2\pi\frac{n-m}{T}t\right) + \eta(t), \quad (4)$$

where η(t) is the additive noise term. Then, at demodulation module 113, the squared waveform r(t)r'(t) is carrier demodulated using the complex waveform $\exp(-j2\pi t/T)$. The demodulation procedure, represented by mixer 113 and integrator 114, is represented by $$d = \frac{1}{T}\int_0^T r(t)r'(t)\exp\left(-j2\pi\frac{t}{T}\right)dt. \quad (5)$$

The demodulation result, therefore, has the form:

$$d = \sum_{k=0}^{K-2} H_{k+1} H'_k s + \eta, \quad (6)$$

where η is the noise term. Where the channel frequency response varies slowly in the frequency domain (i.e., $H_k \approx H_{k+1}$), the demodulation result d may be approximated by:

$$d \approx \sum_{k=0}^{K-2} |H_k|^2 s + \eta, \quad (7)$$

Signal s may be recovered from the demodulated signal d in decision circuit 115.

Figure 2:
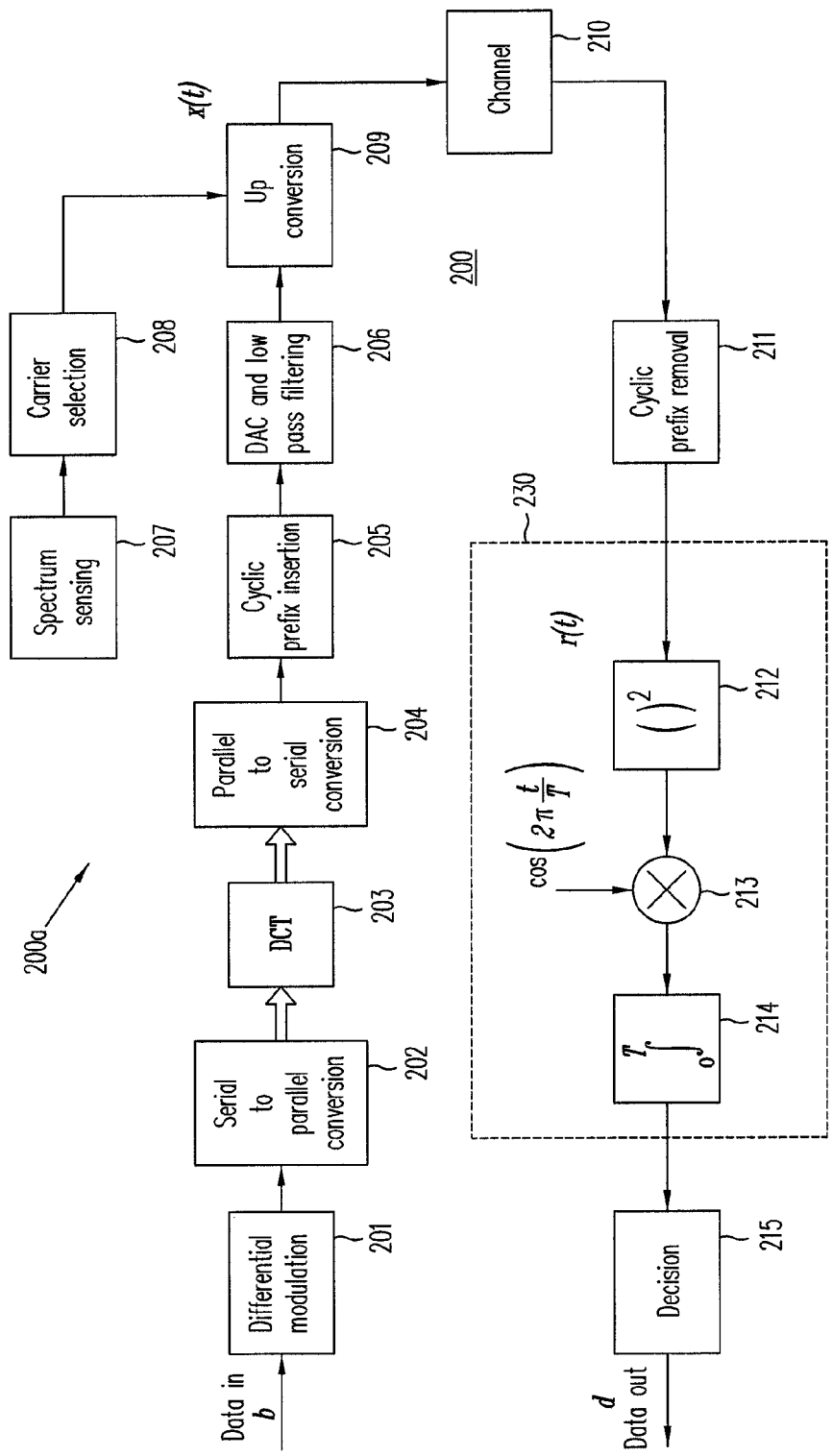
FIG. 2 is a block diagram of real differential multi-carrier modulation and demodulation system 200, in accordance with one embodiment of the present invention.

FIG. 2 is a block diagram of real differential multi-carrier modulation and demodulation system 200, in accordance with one embodiment of the present invention. Real differential multi-carrier system 200 may be realized in real channels. As shown in FIG. 2, real differential multi-carrier system 200 transmits a binary phase shift keying (BPSK) signal in symbol duration T. (Of course, BPSK is used in FIG. 2 merely as an example; other signal modulation scheme may also be used to provide signal s.) As in complex differential multi-carrier system 100, the modulated signal of real differential multi-carrier system 200 may be transmitted by a conventional OFDM transmitter.

Transmitter 200a transmits a symbol of amplitude-normalized BPSK signal b∈[−1,1] in each symbol duration of T. In order to avoid interference with another wireless system, carrier frequency $f_c$ is selected, after scanning the spectrum. In the differential modulation module 201 in FIG. 2, data samples $\alpha_k$, k=0, ... K−1, are constructed from b according to the following equations:

$$\alpha_0=1$$

$$\alpha a_k=b^k, k=1,\ldots K-1 \quad (8)$$

Data samples $\alpha_k$, for k=0, ... K−1 are then modulated on the set of K real carriers $\cos(2\pi(k/T+f_c)t)$, k=0, ... K−1, which are orthogonal in the duration t∈[0, T]. This can be carried out with modules in FIG. 2 including serial-to-parallel conversion 202, discrete cosine transform (DCT) 203, parallel-to-serial conversion 204, CP insertion 205, DAC and low pass filter 206, and up-conversion module 209. The resultant waveform (not including the CP), which may be transmitted over a conventional transmit antenna, is represented by:

$$x(t) = \sum_{k=0}^{K-1} 2a_k \cos\left(2\pi\left(\frac{k}{T} + f_c\right)(t - T_{cp})\right), t \in [0, T + T_{cp}], \quad (9)$$

which may be rewritten as:

$$x(t) = \sum_{k=0}^{K-1} a_k \exp\left(j2\pi\left(\frac{k}{T} + f_c\right)(t - T_{cp})\right) + \quad (10)$$

$$\sum_{k=0}^{K-1} a_k \exp\left(-j2\pi\left(\frac{k}{T} + f_c\right)(t - T_{cp})\right).$$

After propagation over channel 210, the CP may be removed from the received waveform in CP removal module 211. The CP-removed, received waveform may be represented by:

$$r(t) = \sum_{k=0}^{K-1} a_k H_k \exp\left(j2\pi\left(\frac{k}{T} + f_c\right)t\right) + \sum_{k=0}^{K-1} a_k H_{-k} \exp\left(-j2\pi\left(\frac{k}{T} + f_c\right)t\right), \quad (11)$$

$$t \in [0, T],$$

where $H_k$ is the channel frequency response on the k th frequency component and n(t) is a noise term.

As shown in FIG. 2, the demodulation procedure is represented by the steps in demodulation module 203. First, the received waveform is squared in squaring module 212, where the received waveform is multiplied by itself. Then, the resultant squared waveform $(r(t))^2$ is carrier demodulated using waveform $\cos(2\pi t/T)$, represented by mixer 213 and integrator 214. The demodulation procedure may be represented by $$d = \frac{1}{T}\int_0^T (r(t))^2 \cos\left(2\pi \frac{t}{T}\right) dt \quad (13)$$

$$= \frac{1}{2T}\int_0^T (r(t))^2 \left(\exp\left(-j2\pi \frac{t}{T}\right) + \exp\left(j2\pi \frac{t}{T}\right)\right) dt.$$

The demodulation result is given by:

$$d = \sum_{k=0}^{K-2} a_{k+1} a_k H_{k+1} H_{-k} + \sum_{k=1}^{K-1} a_{k-1} a_k H_{k-1} H_{-k} + \eta, \quad (14)$$

where $\eta$ is the noise term. Using the relationship that $a_k = b^k$ and $b \in [-1, 1]$, equation (14) may be rewritten as:

$$d = \sum_{k=0}^{K-2} H_{k+1} H_{-k} b + \sum_{k=1}^{K-1} H_{k-1} H_{-k} b + \eta. \quad (15)$$

For real channels, the channel frequency response satisfies $H_{-k} = H_k'$. Thus, $$d = \sum_{k=0}^{K-2} H_{k+1} H_k' b + \sum_{k=1}^{K-1} H_{k-1} H_k' b + \eta. \quad (16)$$

For a channel that varies slowly in the frequency domain (i.e., $H_k \approx H_{k+1}$), the demodulation result may be approximated by:

$$d \approx \sum_{k=0}^{K-2} |H_k|^2 b + \sum_{k=1}^{K-1} |H_k|^2 + b + \eta. \quad (17)$$

From equation (17), signal b may be recovered in decision circuit 215.

Thus the present invention may be implemented using a simple receiver structure including only analog processing elements. Consequently, there is no need for an ADC, a high-frequency oscillator, a high-accuracy sampling clock or a high-speed DSP. Accordingly, hardware-cost, form factor (e.g., device size) and power consumption can be significantly reduced, as compared to prior art devices that require complex digital reception techniques. Therefore, the present invention is especially suitable for use in low-cost, low-power consumption—hence, energy efficient—devices, such as sensors in wireless sensor networks, wireless home control/or home automation, WBANs or wireless healthcare networks.

Further, the present invention may be used with any number of frequency carriers. Consequently, the present invention has the advantage of high scalability and high adaptability in the required data rates, according to the requirements of the application under consideration. Because any number of frequency carriers may be used, the present invention allows frequency diversity of the multipath channel be exploited, resulting in high reliability to the wireless system. Such features are especially important for life critical applications common in wireless healthcare and WBANs. The invention is applicable extensively to narrow band, wide band and ultra wide band systems, depending on the number of carriers (thus spectrum) selected.

The above detailed description is provided to illustrate the specific embodiments and is not intended to be limiting. Numerous variations and modifications are possible within the scope of the present invention. The present invention is set forth in the following claims.

We claim:

1. A method for demodulating a received analog multi-carrier modulated data signal, comprising:

within a receiver, squaring the received analog multi-carrier modulated data signal to obtain an analog squared signal;

within the receiver, multiplying the analog squared signal with a signal having a frequency $$\frac{2\pi}{T}$$

in order to obtain an analog product signal, where T represents a duration of a symbol in the received multi-carrier modulated signal;

within the receiver, integrating the analog product signal over the duration T to form an analog integration result; and making bit decisions using the analog integration result.

2. A method as in claim 1, wherein the signal having a frequency $$\frac{2\pi}{T}$$

comprises a complex signal having the form $$\exp\left(j\frac{2\pi}{T}t\right) \text{ or } \exp\left(-j\frac{2\pi}{T}t\right).$$

3. A method as in claim 2, wherein the analog multi-carrier modulated data signal is a complex signal.

4. A method as in claim 3, wherein the signal having a frequency $$\frac{2\pi}{T}$$

comprises a cosinusoidal signal having the form $$\cos\left(\frac{2\pi}{T}t\right).$$

5. A method as in claim 4, wherein the analog multi-carrier modulated data signal is a real signal.

6. A method as in claim 1, further comprising removing a cyclic prefix from the received analog multi-carrier modulated data signal.

7. A receiver which demodulates a received analog multi-carrier modulated data signal, comprising:
   a squaring circuit for obtaining an analog squared signal from the received analog multi-carrier modulated data signal;
   a mixer for multiplying the analog squared signal with a signal having a frequency $$\frac{2\pi}{T}$$

to obtain an analog product signal, where T represents a duration of a symbol in the received multi-carrier modulated signal;
   an integrator for integrating the analog product signal over the duration T to form an analog integration result; and
   a decision circuit for recovering the data from the analog integration result.

8. A receiver as in claim 7, wherein the signal having a frequency $$\frac{2\pi}{T}$$

comprises a complex signal having the form $$\exp\left(j\frac{2\pi}{T}t\right) \text{ or } \exp\left(-j\frac{2\pi}{T}t\right).$$

9. A receiver as in claim 7, wherein the analog multi-carrier modulated data signal is a complex signal.

10. A receiver as in claim 9, wherein the signal having a frequency $$\frac{2\pi}{T}$$

comprises a cosinusoidal signal having the form $$\cos\left(\frac{2\pi}{T}t\right).$$

11. A receiver as in claim 7, wherein the analog multi-carrier modulated data signal is a real signal.

12. A receiver as in claim 7, further comprising a circuit for removing a cyclic prefix from the received analog multi-carrier modulated data signal.

* * * * *